US009779617B2

(12) United States Patent
Viswanathan

(10) Patent No.: US 9,779,617 B2
(45) Date of Patent: Oct. 3, 2017

(54) NETWORKED LEAK AND OVERFLOW DETECTION, CONTROL AND PREVENTION SYSTEM

(71) Applicant: Mahesh Viswanathan, Grandville, MI (US)

(72) Inventor: Mahesh Viswanathan, Grandville, MI (US)

( * ) Notice: Subject to any disclaimer, the term of this patent is extended or adjusted under 35 U.S.C. 154(b) by 0 days.

(21) Appl. No.: 15/151,487

(22) Filed: May 10, 2016

(65) Prior Publication Data

US 2016/0328956 A1    Nov. 10, 2016

Related U.S. Application Data

(60) Provisional application No. 62/159,350, filed on May 10, 2015.

(51) Int. Cl.

| G08B 19/00 | (2006.01) |
|---|---|
| G08B 29/18 | (2006.01) |
| E03D 11/00 | (2006.01) |
| G08B 21/18 | (2006.01) |
| G08B 21/20 | (2006.01) |

(52) U.S. Cl.
CPC ............ *G08B 29/185* (2013.01); *E03D 11/00* (2013.01); *G08B 21/182* (2013.01); *G08B 21/20* (2013.01)

(58) Field of Classification Search
CPC ..... G08B 29/185; G08B 21/182; G08B 21/20; E03D 11/00
USPC ...................... 340/539.1, 539.11, 521, 573.1
See application file for complete search history.

(56) References Cited

U.S. PATENT DOCUMENTS

| 4,777,670 A | 10/1988 | Klinkhammer et al. |
| 6,696,956 B1* | 2/2004 | Uchida .............. G08B 21/0423 340/539.18 |
| 6,934,977 B1 | 8/2005 | Quintana et al. |
| 8,310,369 B1* | 11/2012 | Canfield ................... E03D 1/00 340/605 |
| 2004/0199989 A1 | 10/2004 | Trolio |
| 2013/0069675 A1* | 3/2013 | Woloszyk .............. G01R 27/22 324/693 |

FOREIGN PATENT DOCUMENTS

EP             1227193        7/2002

* cited by examiner

*Primary Examiner* — Daryl Pope
(74) *Attorney, Agent, or Firm* — Z IP Law PLLC

(57) ABSTRACT

A microprocessor-operated, networked device that uses sensors in, on and near the toilet to detects toilet leaks and overflows of the toilet tank or bowl, then reports these errant conditions with a visual or audible indicator in addition to sending a message via a network (if available) to a computer system that may collate this data with that from other toilets and other sources and subsequently determine further action such as shutting off water or calling a technician. The present invention can be integral to a toilet or removably attached to an existing toilet without this technology.

24 Claims, 13 Drawing Sheets

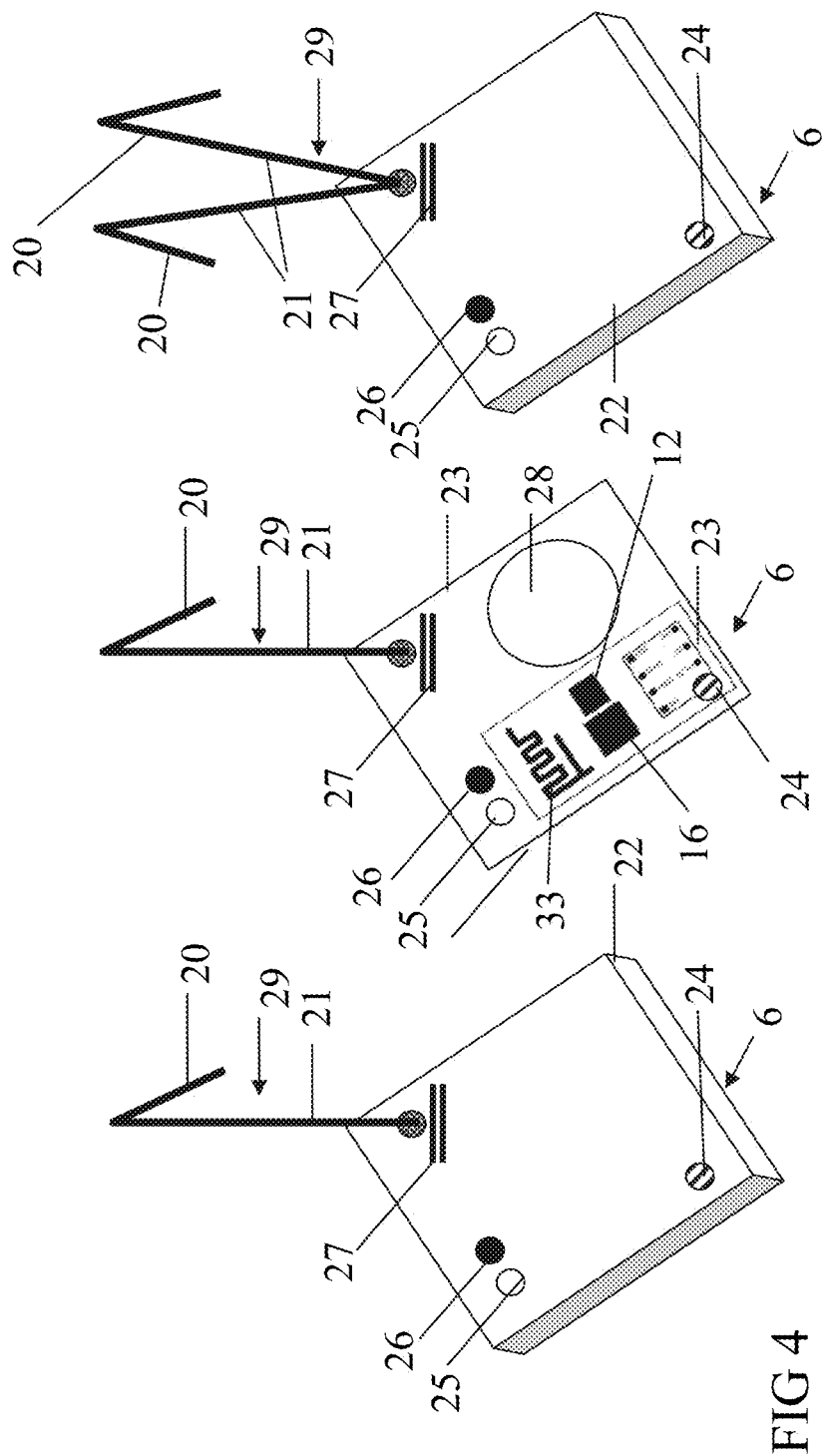

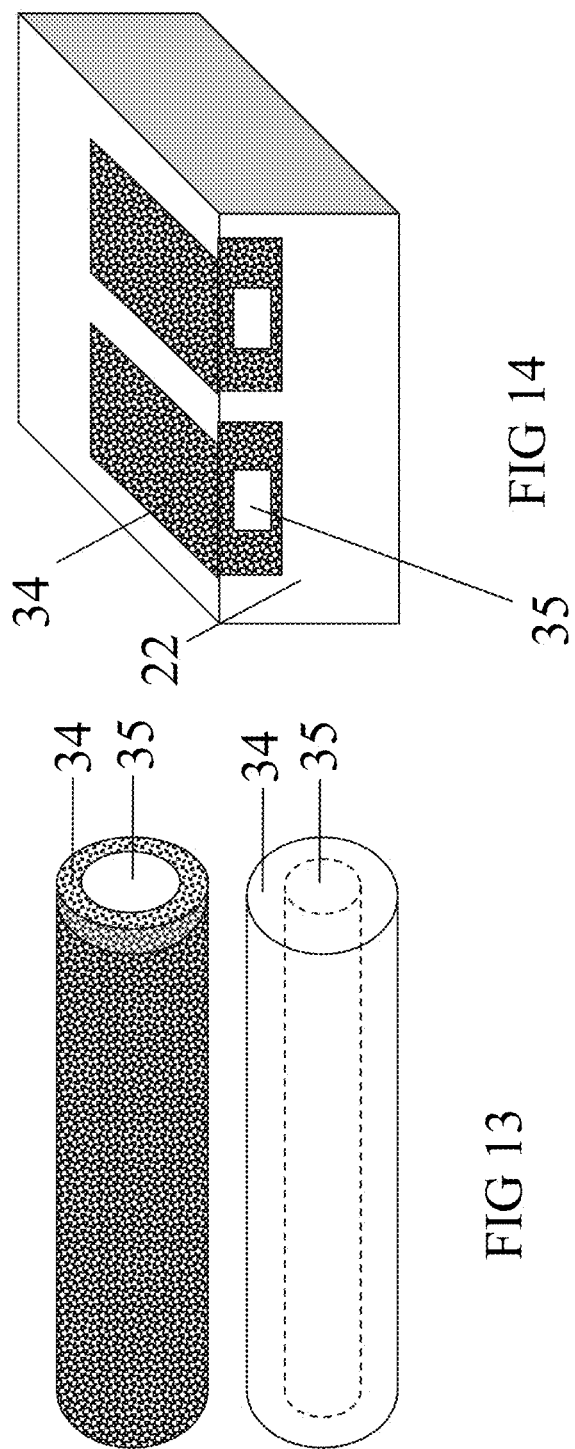

NETWORKED LEAK AND OVERFLOW DETECTION, CONTROL AND PREVENTION SYSTEM

RELATED APPLICATION

This application claims the benefit of U.S. Provisional Application No. 62/159,350 filed May 10, 2015 and entitled EXTENSIBLE NETWORKED FLUID LEAK DETECTION SYSTEM, which is hereby incorporated herein by reference in its entirety.

FIELD OF THE INVENTION

This invention relates generally to fluid detection devices and more particularly to devices for alleviating toilet water leaks into the bowl and for detecting overflows from the flush tank or the bowl.

BACKGROUND OF THE INVENTION

Leaky toilets are the single largest waste of water indoors, a problem that the present invention addresses. Many patents teach mechanical and electrically operated water leak and overflow detection and overflow control devices to detect and selectively prevent the leak and overflowing of toilets. However, they are generally unable to work in toilets and urinals that do not have a tank or an exposed tank and are generally also harder to install, i.e. to add-on to an existing fixture. These devices take sensor readings from inside the tank, which is harder to install or by measuring the vibration of the tank to detect errant operation, which is too indirect and lacks the nuance to detect almost imperceptible flows as they occur. The position of a sensor in the present invention is just inside or just under the rim hole, at the point where the water comes out to flush the system, which is a design not seen thus far in any other invention of the prior art. While some of the leak detectors of the prior art are microcontroller-based, they are not programmed to adapt to changes in the environment, of which there may be many. Nor do they attempt to reduce false negatives by the use of proximity detectors even though the use of such is commonplace in automatic flushing systems (the "electric eye").

Current designs and products also do not take advantage of presence of multiple devices in a locale, by connecting to them in a mesh network or via a central server. Wired or wireless attachment of this type can bring tremendous value in providing large-scale data analysis for significant water savings and also providing the devices with "system updates" thus giving the system the very real benefit of being able to remotely change the behavior of the devices to ever-changing situations.

This invention relates generally to fluid control devices and more particularly to devices for alleviating toilet water leaks into the bowl and for overflows from the flush tank or the bowl. About 20% of all toilets leak, a small toilet leak can waste 30 gallons/day ($0.37/day), a medium leak 250 gallons/day ($3.10/day) and a large leak up to 4,000 gallons/day ($49/day). Reducing this waste is the motivation for this invention.

SUMMARY OF THE INVENTION

The present invention incorporates a leak and overflow detection and prevention system and its subsystems which include typically leak and overflow detection devices and sensor assemblies, formed integrally with or removably attached to a toilet and/or its environs. The leak and overflow detection and prevention system detects errant conditions such as leaks and overflows and performs responsive actions to alleviate the condition. These responsive actions may include the issuing of a visible or audible alert and/or the sending of an electronic message to a person or a computer system to provide notification of the leak or fault within the toilet system. The notification identifies the location or the toilet through a wireless or wired internet connection to provide for a person remote from the toilet location to be aware of the necessity for further action. The leak and overflow and prevention system provides information and status on a plurality of toilet systems in a more expeditious, reliable and cheaper manner than leak detection devices of the prior art.

The particular objects of this invention are to provide a leak and overflow and prevention system for a conventional toilet and its environs. The leak and overflow and prevention system is comprised of one or more electronic devices having integral or separated subparts such as leak detectors and sensor assemblies attached to the toilet and/or its environs such as under the rim, on the inside wall of the rim, inside the tubular cavity of the rim, in the rim hole, outside and/or inside of the toilet bowl, outside and/or the inside of the flush tank, near or on the flush actuator, on the floor near the toilet, or to the siphon jet (the base outlet in the bottom of the toilet from where high pressure water evacuates the bowl in some designs. The leak detection device may in some embodiments comprise a microcontroller which is attached to one or more subsystems via wire, such as through an analog or digital device attached directly or daisy chained via a serial or parallel "bus" protocol. In some embodiments, the leak detection device and one or more subsystems are connected using a wireless transmission and protocol such as using electromagnetic (EM) means including RF, visible light and infrared (IR) and/or sound including ultrasound. The one or more subsystems may typically include at least one sensor assembly comprising sensors of various modalities for sensing various environmental conditions, such as but not limited to water flow rate, water level, proximity detection and wetness with each sensor assembly transmitting readings to the microcontroller.

The sensor assemblies optionally have the capability to have their functioning modified automatically or under the control of the microcontroller to accommodate a varying environment. The functioning modification may for example, be an adjustment to sensitivity in order to modify the sensor to become more or less sensitive in its readings. The sensor assemblies may include memory devices for recording digitized sensor data for small or for significant amounts of time. The sensor data may be transmitted to a local microcontroller within a sensor assembly or be transmitted to the microcontroller of the leak detection device for deductions and analysis. The sensor assemblies and/or the leak detection device may include human-recognizable alert devices, typically visual or aural, such as a flashing LED, speaker or buzzer to notify a human in the vicinity.

In some embodiments, a wired or wireless means for transmitting and receiving data from the sensor assemblies and/or leak detection device via a computer network such as Ethernet, Wi-Fi, Bluetooth, Bluetooth Light, Bluetooth Low Energy (BLE), or other to a central leak and overflow and prevention system server is provided. The central leak and overflow and prevention system server may include software programs having algorithms stored within microcontrollers, memory and data storage to analyze data from one or more leak detection devices and/or sensor assemblies to make deductions based on data received from this and other devices of one or more varieties and optionally using data from other sources. From such analysis, the leak and overflow and prevention system determines which toilets and their environs need immediate attention, service or preventative maintenance. For toilets requiring immediate attention, commands may be signaled to the leak detection devices or one or more devices within the leak and overflow and prevention system to perform actions such as automatically affecting that toilet and its environs by using a means to close the water supply to the toilet and/or shut down the water supply further upstream in the plumbing work of the building and/or send notifications to persons to take such action. In addition to which, the leak and overflow and prevention system may store and make accessible to a user incident data such as location, time, severity of water loss, actions taken and other information for maintenance analysis and other purposes. The leak and overflow and prevention system may further provide for the transmission of incident data to external systems or users for further maintenance analysis and for any other purposes. These and other objects and advantages of the present invention are achieved by providing a system held in or to a toilet having leak detecting, overflow detecting, human proximity detecting, toilet water level detecting, evacuation pressure detecting, floor wetness detecting means, and the transmission of data by sending signals to a local leak detection device and/or a central processing leak and overflow and prevention system to automatically send instructions to one or more other devices to take appropriate action or by sending notifications to persons which may include instructions for the appropriate actions that must be taken.

The environment in and around a toilet is harsh with exposure to water, cleaning chemicals and human waste, which are all corrosive in nature. Any metallic parts used in sensor assemblies or in the leak detection devices are particularly susceptible to damage in these environs. The leak detection devices and the sensor assemblies used within the leak and overflow and prevention system are therefore all ruggedly made to ingress protection standard IP68 to be completely impervious to dust and liquid even when fully immersed. In some embodiments, the sensor assemblies may be electronic or electromechanical devices that use conductors as sensors that are often made of metallic materials. For example, water flow, wetness and water level sensors may be two electrical conductors arranged close to each other. The two electrical conductors are separately connected to battery or other power supply. When water flows over the two conductors, an electrical circuit is completed and current flows between the conductors, the current flow being commensurate with the amount of water connecting the two conductors, up to a limit, beyond which no higher current measurement is possible based on the sensor assembly circuitry. A voltage reading showing the change in voltage indicating current flow may be shown within an LED or LCD display on the sensor assembly. If the current flow exceeds a sensitivity tolerance level as preset in the microcontroller or on the sensor assembly a signal may be sent to activate one or more human-recognizable alert devices within or electrically connected to the sensor assembly. The alert may typically be visual or aural, such as a flashing LED, speaker or buzzer to notify a human in the vicinity of the leak detection incident. In addition to or in the alternative, the signal noting a change in voltage and indicating the amount of current flow may be transmitted to a leak detection device installed within the vicinity of the toilet. If the amount of current flow is within a preset sensitivity tolerance level, the incident data may be stored and on the leak detection device and/or be transmitted to the central leak and overflow and prevention system server to be used in analysis and further processing. Alternatively, sensors may be polled at regular periods and sensor data stored locally and/or transmitted to a central server.

In order to avoid corrosion and thus deterioration of the electrical signals from the sensors, the electrical conductors and other electrical contacts within the sensor assemblies may, as is common, be made of metals or alloys that resist corrosion. However, these are generally more expensive and less ductile than the more easily corroded copper, aluminum or steel which are generally used in the manufacture of electrical wires. In some embodiments to reduce corrosion and improve electrical signals, the exposed metallic material is coated with carbon or graphite, which is electrically conductive but chemically highly inert. A gel, also inert, containing graphite particles is coated on the metallic conductors and allowed to cure. This then protects the metal from corrosion and yet provides conductivity. While this conductivity is lower than that of the metal, the conductivity of water is far lower and thus there is not much reduction in the sensitivity of the sensor. The exposed graphite-in-gel is flush with the body of the sensor so that it is not physically abraded significantly over time.

In other embodiments the present invention uses non-contact capacitive sensors. The non-contact capacitive sensors are a conductor—typically a sheet of metallic material—connected directly to a pin on the microcontroller and indirectly to another via a high resistance (e.g. 1 mega Ohm). An advantage is that the sensor requires only one wire. Other sensors typically require two wires to make an electrical connection. The non-contact capacitive sensor readings are proportional to the surface area of the sheet of metallic material exposed to the grounding object and to the value of a large resistor (e.g. 1 mega Ohm) as part of a typical circuit. Importantly, a non-contact capacitive sensor will work even if there's an electrical insulator between the conductor and grounding body. A chemically inert insulator such as vinyl can thus be coated on the conductor, thereby insulating it from the corrosive environment of the toilet.

In the present invention the non-contact capacitive sensor, of which several exemplary embodiments are described below, is used to detect water. In manufacturing the sensor, a conductor such as of a metallic material is enclosed in an inert non-conductive material such as vinyl. As a wetness sensor, the non-contact capacitive sensor is connected to an electrical circuit and exposed to water flow. The readings obtained as the water flow is progressively increased are proportional to the wetness of the sensor which then may be used to determine a tolerance for wetness and for water flow to set a sensitivity tolerance level that may be preset on a sensor assembly or leak detection device and be adjusted based on environmental conditions in and around the toilet, such as based on humidity levels.

Some embodiments of the present invention also use a non-contact capacitive sensor as a proximity sensor that may be used to determine water level in the bowl, by hanging, mounting or otherwise affixing the capacitive sensor on the inside vertical rim wall of the bowl. The capacitive sensor will provide or transmit a reading that is higher when the water in the bowl is near to the sensor and provide or transmit a reading that is lower when the water in the bowl recedes. As this type of sensor cannot differentiate between a human in proximity and a body of water, other sensors, such as proximity detectors for humans such as an ambient light or motion detector may be used as filters for false positives. Through an analysis of changes in the signals from the capacitive sensor in combination with changes in signal from a motion detector or other proximity device using the leak and overflow and prevention system software, proper water level readings may be obtained and variances from average determined water levels may be stored to be used with other sensor readings to determine leaks, faults or other incidents of toilet malfunction.

The present invention provides an improvement over leak detection devices of the prior art by using fewer components. For example, the current cost of microcontrollers is very low, costing just a few dollars. Thus, an object of this invention is to use as few discrete components as possible, for example, by using a single module SOC (system-on-chip) that includes a microcontroller with an operating system, volatile (RAM) and non-volatile (flash) memories, Wi-Fi, LED, LDR and multiple digital I/O pins and analog inputs, with the complete module currently retail priced at around $4. The SOC module provides the electronic components and electrical connection points for the sensors and sensor assemblies installed in and around the toilet. The SOC module also removes requirements for discrete components and manufacturing steps for example, by tying an input pin high removes the need for a pull-up resistor. The SOC module software and algorithms increase the signal to noise S/N ratio of sensors whenever possible, rather than using an amplifier circuit that would require additional components. The SOC module within the leak and overflow and prevention system also provides for components to have multiple functions. For example, the LED may function as both a visual indicator and as a proximity detector in the same circuit. As a proximity detector, the LED, when reverse-biased, functions as a photodiode and the charge it holds in this state is released as a photocurrent during forward-bias. By measuring the time taken to discharge the level of ambient light can be construed and changes within the time taken for discharge may indicate human motion in the vicinity of the toilet.

Another object of the present invention is the capability to run the leak detector and/or sensor assemblies on battery, solar cells or connected to the main power supply within a building with design features to assist in having a power source that can effectively power devices and assemblies within the system for many years. To this end, the present invention uses very low power microprocessors and microcontrollers with the ability to have almost all their subsystems periodically turned off to save power. The microcontroller is awakened either by timer interrupt or external interrupts to perform a function, after which it rapidly powers off again until the next interrupt. The microcontroller therefore spends almost all of its time sleeping. Variations of the invention are able to be powered by "coin cell" batteries such as the ubiquitous CR2032 which can deliver up to 250 mAh (milliampere-hour).

In operation, a leak detector or sensor assembly having a microcontroller and/or microcontroller may in some embodiments turn on using a timer every ten seconds—a good compromise between granularity of readings and saving battery life—or by other interrupt such as a button. The microcontroller then turns on only required internal and external subsystems, performs any functions required, then goes back to sleep until the next interrupt. Readings from sensors and any deductions made are stored in the volatile (RAM) or non-volatile (flash or SD Card) memory. Three to twelve months of data may be reasonably kept in the flash memory available in a SOC (system-on-chip) currently available on the market. Either periodically or triggered by an event, the data from the microcontroller's memory is uploaded via a network to the central leak and overflow and prevention system server, for further analysis. At the same time, any software updates are downloaded from the central server through OTA (over-the-air) updates. Network activity is kept to a bare minimum to reduce power consumption.

When the microcontroller awakens, a query of sensor readings is performed and the sensor data is stored in memory. A sequence of readings by themselves or in correlation to readings from other sensors within the environment of the toilet may trigger an event based on rules stored in the microcontroller, as described herein. The query readings may be transmitted to the central leak and overflow and prevention system server for processing and correlation to other leak detectors and sensor assemblies installed on other toilet systems, such as on all toilet systems within a building or group of buildings within an area. From data analysis of query readings from one or more toilet systems, the central leak and overflow and prevention system server may transmit a notification or command to the leak detector or sensor assembly to perform an action to stop or prevent a leak incident, as described herein. After the sensor reading query, receipt of transmission from the central server and performance of any necessary actions, the microcontroller may shut down again until interrupted by the timer in for example ten seconds or using another interrupt device. The interval may be longer or shorter as required by the environment and usage of the toilet system. The microcontroller when entering a sleep state, turns off almost all of its internal subsystems to save power: it shuts off all digital inputs/outputs, analog inputs/outputs, all clocks possible and signals all external subsystems to also shut down.

The leak and overflow and prevention system comprises software having algorithms that put into place tolerance levels, time limitations and other rules that determine the state of the toilet system as, for example, quiescent, flushing, leaking or overflowing or likely to overflow soon. The following examples illustrate possible functioning of the leak detection devices and/or sensor assemblies within the leak and overflow and prevention system, and the data analysis and command structure of the leak and overflow and prevention system:

In normal operation the leak detector or sensor assembly query reveals from sensor data:
  1. Proximity sensor and wetness sensor within toilet bowl registers a signal within a preset period of time indicating a person using the toilet. A leak incident is not detected and an alert is not triggered.
  2. Wetness sensor within toilet bowl registers a signal. Proximity sensor does not register a signal within a preset period of time providing no indication that a person using the toilet. A leak incident is detected and an alert is signaled and/or notification is sent to the microcontroller of the leak detector and/or the central leak detector and prevention system server. The leak detector, sensor assemblies and/or other devices within the system perform actions transmitted by the central server such as continue alert signal, shut off water supply to toilet, shut off supply to one or more toilets within the system.

The central leak and overflow and prevention system server gathers data system-wide from hundreds to tens of thousands of leak detector devices and sensor assemblies. This data includes the location of each toilet and sensor assembly, the historical readings with timestamps from each and the hardware and/or software versions and installation dates of each leak detector device and sensor assembly. At this point, data analysis of the type well-known to those skilled in the arts is performed on the data sets combined with location-specific data (such as elevation, water pressure, water hardness, time of day, day-of-week, date, month, year, season, holidays, etc.). Analysis can be performed through both human-written and machine-derived (e.g. via artificial intelligence or artificial neural networks) algorithms that can evaluate, correlate and filter data for leak incident, fault and other operational conditions by, for example, normalizing some data points then observing differences in others. Anomalies detected may indicate, among other things: toilet leak, toilet overflow, change in water hardness (if many toilets in the same location show similar changes in readings since a predetermined period of time, such as, a few days ago); change in water pressure (if toilets in the same location show similar changes in readings since a predetermined period of time and there are predictable differences in water pressure between toilets on different floors within a building); improper sensor placement (if readings are somewhat in line with other similarly installed sensors within a vicinity of toilet systems but the readings are in comparison are regularly either too high or too low); a leak detector device or sensor assembly needs replacement, battery change or attention (if such device stops providing data to the central server). Toilets in a single facility, for example, in an office, would form an equivalent group such that the average of readings from those toilet systems can be used as a baseline to test the compliance of other individual toilet systems within the group. Additionally, interesting data such as usage patterns, predicting a need for more (or possibly less) toilets in an area may be gleaned from analyzing the data.

In computer systems, rules are defined within algorithms to set process steps that may be in the form of IF (condition) THEN (action). A system that uses high level, often human-understandable, IF-THEN statements is called a "Rule-Based System" by those skilled in the arts. The detection of errant or other statuses is dependent on correctly interpreting the sensor data based on the analysis and correlation of data and the rules known and developed from this analysis. Rules may be written by humans or be computer-derived. Rules may be set within software programs installed on a leak detector device, a sensor assembly or on the central server and in some embodiments can be moved and installed through commands between the digital devices and systems. Of course, rules involving data from other leak detector devices and sensor assemblies outside of a toilet system will generally need to reside on the central server unless a mesh network is used between the devices in a location in which case, the determination of what a toilet's current status is can be made by the devices themselves, which act as both clients and servers to each other.

Shown below are some samples of rules in the system. When the probability of an event crosses a threshold, it is assumed that that event has occurred and suitable action is to be taken. The microcontroller tracks probability variables for leaks, overflows and other conditions over a moving time window by adding weights based on events transpiring. Some of these rules are provided in the diagrams attached.

As an example, a probability that a leak is detected IF a phantom flush is detected and the wetness sensor is wet longer than a predetermined amount of time, such as five minutes. The rules may also include a determination of sweating as described herein and IF there is sweating, the probability of a leak is decremented. The use of proximity sensors determines if the toilet has recently been in use and IF there are low or no readings in a predetermined period of time within the recent past, but wetness now occurs the probability is high that there is a leak and the wetness is not because someone has been flushing the toilet.

The probability of an overflow is incremented from low to high IF a sensor assembly at the rim inner wall at the upper portion of the toilet bowl detects wetness possibly indicating that water in the bowl has breached the rim level and overflow is imminent or is occurring. The probability that a leak has not occurred may increment from high to low IF the water flow sensor isn't wet and there are no "phantom flushes" but a moisture sensor external to the tank is wet indicating a "sweaty tank" instead of a leak incident. The probability of a "sweaty tank" instead of a leak may also be confirmed using sensor data from other toilets within a vicinity of this location. The sensor data collected may be used to adjust sensitivity tolerance levels and certain toilets may be marked within the system as prone to sweating. Through data analysis the continual wetness of the external tank sensor may be co-incident with humid days using data from weather reports to increment the probability that the leak incident is a "sweaty tank" instead of a leak.

In a heavy traffic area such as an office or airport, the probability that a leak incident increments from high to low IF in the high usage of the toilet the water flow detector is wet for a long period of time but there are indications of proper flushes in between the high usage. Further sensor data may indicate that the high usage is around the same time of day, only on certain days of the week such as Monday through Friday with virtually no usage on Saturday and Sunday or the high usage is co-incident with peak periods of use in a travel facility such as an airport or train station.

The probability that an overflow is likely or imminent may increment from low to high IF after a normal flush, the water level in the toilet descends slower than normal as compared to previously collected sensor data for that toilet or the water level descends slower than in comparison to sensor data from other toilets in the same vicinity. The probability that an overflow is likely or imminent may increment from low to high IF the water level does not descend to the expected level at all as determined from previously acquired sensor data and sensor data indicates that the water rises beyond the bottom lip of the rim of the toilet bowl.

The probability that the toilet shut-off valve is not open completely is increment from low to high IF after a normal flush, the water flow sensor does not dry within a predetermined period of time. The probability that a water flow sensor is improperly installed is incremented from low to high IF the water flow sensor readings profile, when normalized with flow sensor readings from other toilets indicates that the signal is either too low meaning that the sensor is not getting enough water to impinge on it or the signal reaches a maximum value often indicating water is not draining off of the sensor properly. The probability that a leak detector device or sensor assembly needs replacement or needs a new battery increments from low to high IF sensor data is not received by the central server for a predetermined period of time such as a three-day period or at the start of a normal flush, there is no indicator light such as a quick blink of an LED on the device for example through inspection by a human, indicating the device has no power.

The present invention may further provide presets for modes of operation to configure leak detector devices, sensor assemblies and other devices within the leak and overflow and prevention system to meet the usage and demand of certain locations and settings. For example, by setting the mode of operation a stricter or laxer operation and data acquisition rate is set to meet certain types of usage. This mode of operation can be set remotely by the central server and may include the following:

Demo mode. The demo mode is for display and device test purposes and provides for all time durations to be compressed, for example wetness for 5 seconds is interpreted as a leak, as opposed to normal operation settings that may require wetness for a period of for example 6-8 minutes.

Residence mode. The resident mode is an operational setting for homes and hotel rooms that have low, predictable usage. The usage schedule is expected as during a few times in the morning, a few times in the evening and a few times at night. Readings collected at times that don't conform to the usage schedule may be flagged as errant conditions for further monitoring and or be determined as leak incidents.

Office mode. The office mode provides for a usage schedule that is unpredictable where there is high, possibly almost continuous usage of a toilet during certain times of day such as the morning and the afternoon and very little usage on evenings and weekends. Readings collected at times that don't conform to the usage schedule will be flagged as errant conditions for further monitoring and or be determined as leak incidents.

Public area mode. Stadiums, movie theatres, airports, restaurants and train stations show varied and high usage, more random than in offices. Leak and overflow detection rules may be made lax during high usage periods and then stricter when the surge in usage abates.

The present invention is related to a leak and overflow detection system for a toilet, comprising: a microcontroller; wetness sensor; and proximity sensor; and wherein false positives in leak detection are reduced by correlating proximity data with wetness sensor data to determine the presence of a human using the toilet. The leak and overflow detection system for a toilet of wherein false positives in leak detection are reduced by correlating proximity data and wetness sensor data from other toilet systems within the leak and overflow detection system. The leak and overflow detection system for a toilet wherein false positives in leak detection are reduced by correlating environmental conditions with sensor data. The leak and overflow detection system for a toilet wherein a notification and alert is sent to a central server when a leak is detected. The leak and overflow detection system for a toilet comprising modes of operation based on usage schedules. The leak and overflow detection system for a toilet comprising integration of data from external wetness and proximity sensors. The leak and overflow detection system for a toilet wherein the wetness sensor is installed directly under the rim hole to detect water at its point of exit. The leak and overflow detection system for a toilet wherein the wetness sensor is a non-contact capacitive sensor. The leak and overflow detection system for a toilet wherein the wetness sensor is a pressure sensor. The leak and overflow detection system for a toilet wherein the wetness sensor is a capacitive sheet placed underneath and on the bottom of the toilet bowl. The leak and overflow detection system for a toilet comprising an attachment hanger having a bendable hook and flexible stem for insertion into any size rim hole of the toilet. The leak and overflow detection system for a toilet capable of use with any type of toilet. The leak and overflow detection system for a toilet scalable to access and transmit data to tens of thousands of devices. The leak and overflow detection system for a toilet of claim 1 wherein software updates to the microcontroller are upgraded remotely through a connection with a central server.

The present invention is also related to a method of leak detection in a toilet comprising detecting the proximity of a human to the toilet; detecting wetness on a sensor; correlating the detection of a human to the toilet to the detection of wetness to reduce false positives in leak detection. The method of leak detection in a toilet comprising; monitoring sensor data; identifying conditions from sensor data; notifying through signal transmission, conditions indicative of impending overflow.

The objects and features of the present invention, which are believed to be novel, are set forth with particularity in the appended claims. These aspects of the invention are not meant to be exclusive and other features, aspects, and advantages of the present invention will be readily apparent to those of ordinary skill in the art when read in conjunction with the appended claims and accompanying drawings.

BRIEF DESCRIPTION OF THE DRAWINGS

Specific embodiments of the invention have been chosen for the purpose of illustration and description, and are shown in the accompanying drawings, which form a part of this specification. The present invention, both as to its organization and manner of operation, together with further objects and advantages, may best be understood by reference to the following description, taken in connection with the accompanying drawings, wherein:

FIG. 4. is a perspective view of another embodiment of the leak detector of the present invention with a single attachment hanger;

FIG. 5. is a perspective view of an embodiment of the leak detector of the present invention with the outer housing removed;

FIG. 6. is a perspective view of the embodiment of the leak detector of the present invention of FIG. 4 with two attachment hangers;

FIG. 13. is an embodiment of a graphite-coated water sensor;

FIG. 14. is another embodiment of a graphite-coated water sensor;

DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide for an improved and simplified leak detection and overflow detection and prevention system.

Figure 1:
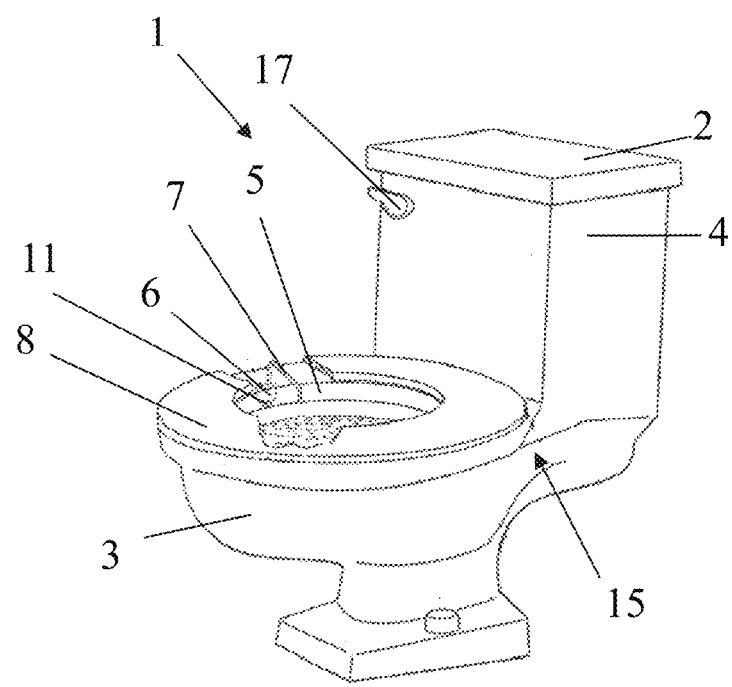
FIG. 1. is a perspective view of a toilet bowl unit with an embodiment of a leak detector of the present invention.
Figure 2:
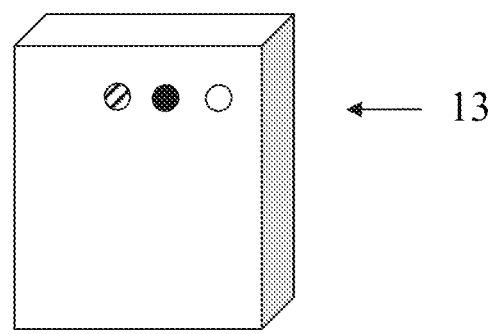
FIG. 2. is a perspective view of an embodiment of the leak detector of the present invention.

As shown in FIG. 1, embodiments of the leak and overflow and prevention system has one or more leak detectors, sensor assemblies and other devices located within the vicinity of the toilet 4 being monitored for leaks. A particular embodiment of a leak detector device 6 of the present invention is shown mounted off to the side of the bowl 3 of the toilet 1 suspended from the upper rim 5 of the toilet bowl 3 using a wire hook 7 as shown through a cut-out of the seat 8. While detection devices of the present invention such as leak detector devices 6 and sensors 11 as part of the leak detector 6 or as separate sensor assemblies 13, as shown in FIG. 2, may be mounted at various locations in and around a toilet or urinal, preferably the sensor 11 is as far as possible under the rim hole within the bowl 3 at a point behind the toilet seat 8 and closest to the tank 4 as indicated by arrow 15 or at the center back of the toilet 1 or urinal 20 when a tank is not visible. Other possible mounting points for sensors 11 are under the flush lever 17, on the toilet tank lid 2, on the internal side of the tank 4, behind the toilet seat 8, behind the toilet tank 30, on the toilet bowl 3 or outside of the rim 5 of the toilet bowl 3. The leak detector device 6 or sensor assemblies 13 may be installed anywhere on or near the toilet 1 using screws, adhesives or other attachment fixtures.

Figure 3:
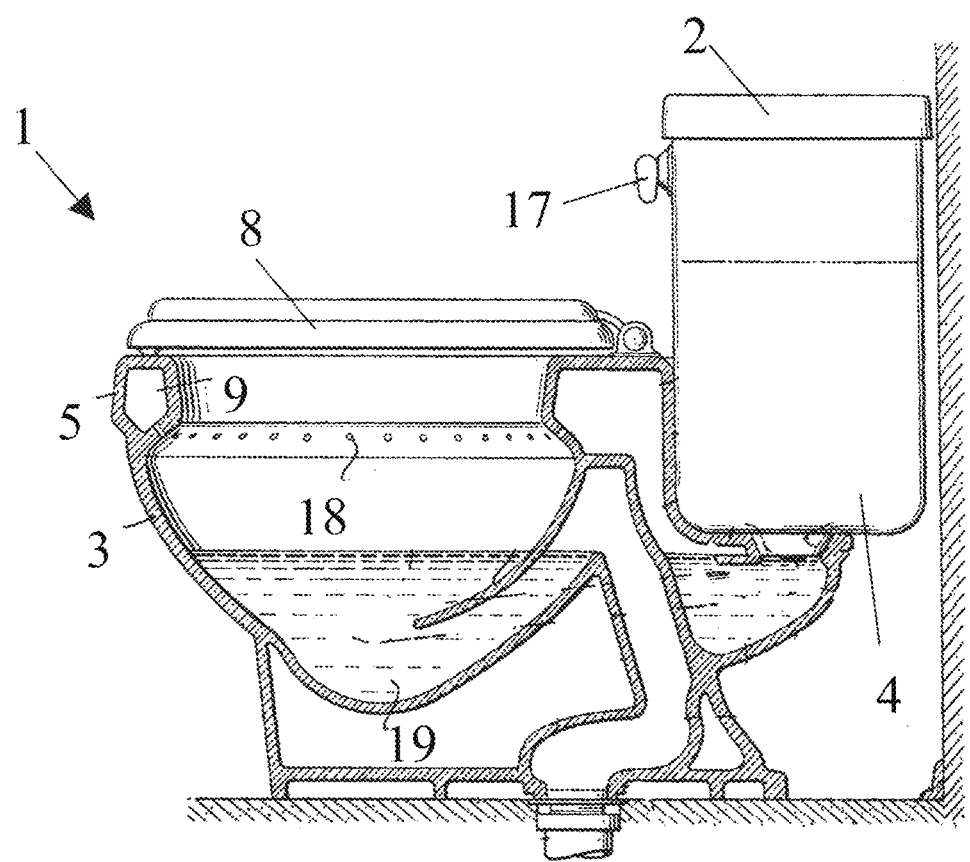
FIG. 3. is a cross sectional view of a rim, showing the rim holes.

As shown in FIG. 3, a toilet 1 has a rim 5 within which is a cavity 9 through which water flows when the toilet 1 is flushed exiting via rim holes 18 into the toilet bowl 3 for a period of time to set the appropriate water level 19 within the toilet bowl 3. In another embodiment of the leak detector 6 of the present invention, as shown in FIG. 4, all components of the assembly are designed to be integral and enclosed within a case 22. As shown in FIG. 5, the case 22 provides an enclosure for a microcontroller 12 on a PCB 23 including that includes components for wireless transmission 16 with an on-board antenna 33, an LED 25, a control button 26, a proximity sensor 24, a wetness sensor 27, a battery 28. One or two attachment hangers 29, as shown in FIG. 6, may be affixed to the casing 22 of the leak detector 6 to securely hang the leak detector 6 from different locations in and around the toilet 1. The attachment hanger 29 has a hook 20 and an extended length stem 21. The hook 20 can bent to any shape to accommodate different mounting positions in or on a toilet 1 and toilets and urinals of different sizes and configurations. The hook 20 is thin flexible but rigid to easily slide through rim holes 18 of different sizes and be suspended or affixed to the top of the toilet bowl 3. The leak detector 6 may be removed when necessary by strongly pulling on the stem 21 to pull the hook 20 out of the rim hole 18. In preferred embodiments, the leak detector 6 and sensor assemblies 13 are disposable and are thrown away after failure or extended use.

Figure 7:
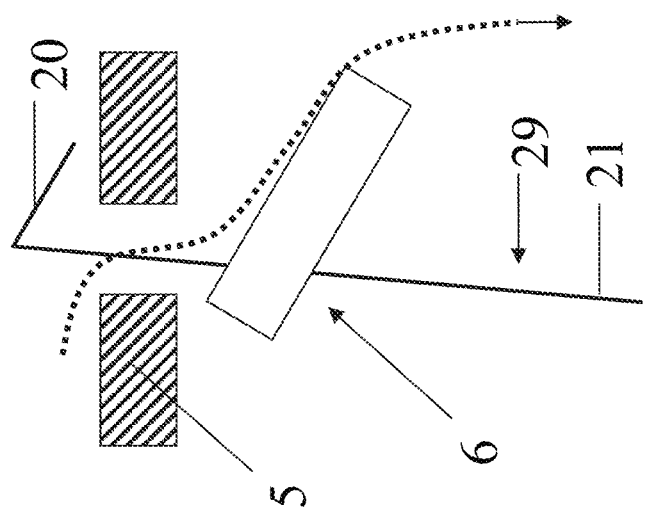
FIG. 7. is a side elevation view of an embodiment of the leak detector of the present invention mounted in the rim hole of a toilet.
Figure 8:
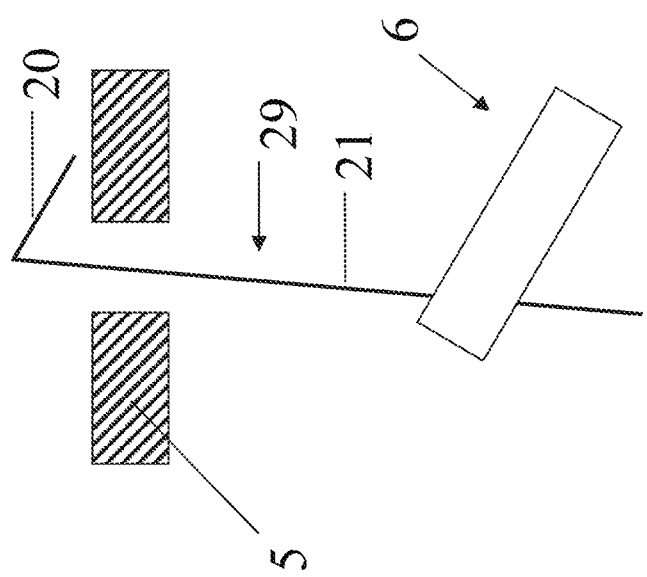
FIG. 8. is a side elevation view of an embodiment of the leak detector of the present invention mounted in the rim hole of a toilet and raised on the stem of the attachment hanger.
Figure 9:
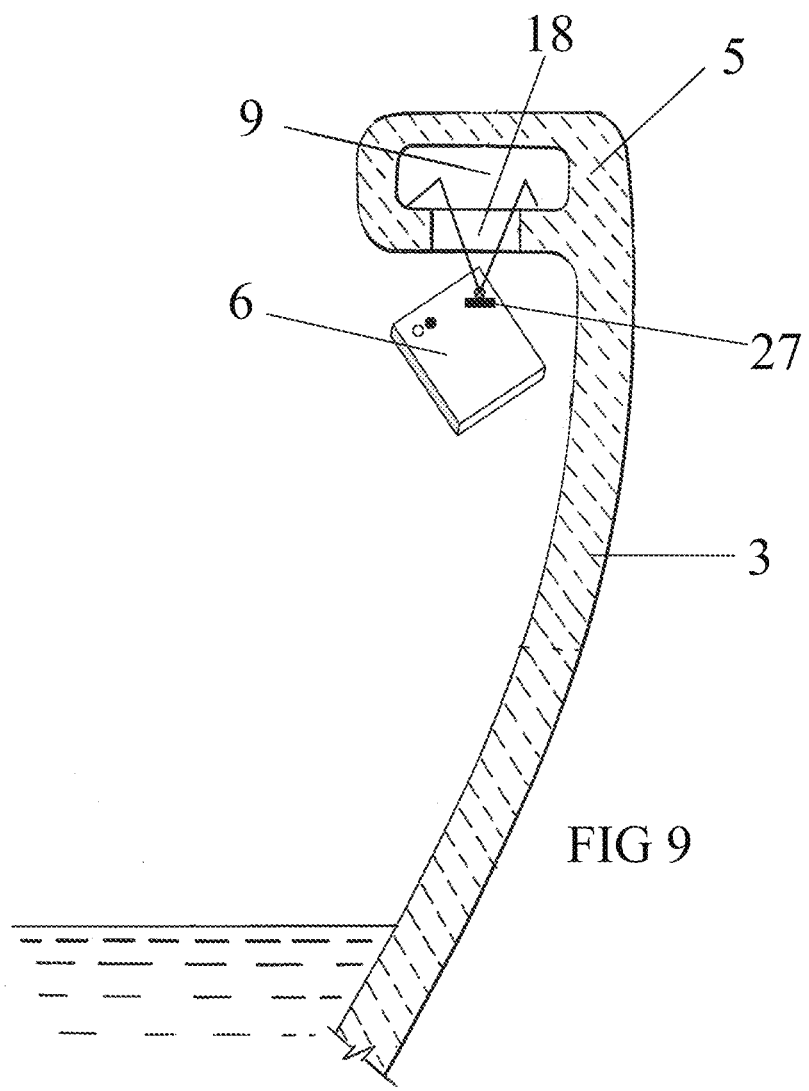
FIG. 9. is a cross section of a toilet with an embodiment of the leak detector of the present invention suspended from the rim hole using two attachment hangers.
Figure 10:
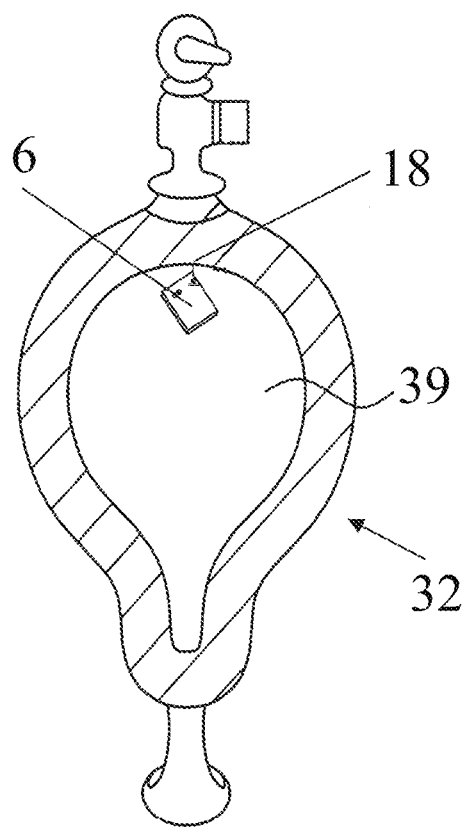
FIG. 10. is a front elevation view of an embodiment of a leak detector of the present invention mounted in the rim hole of a urinal using an attachment hanger.
Figure 11:
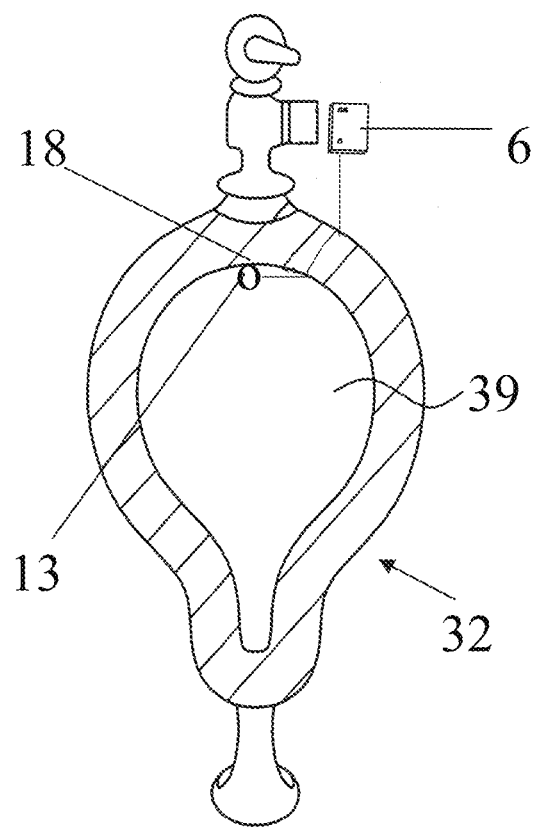
FIG. 11. is a front elevation view of an embodiment of a leak detector of the present invention affixed near the urinal and a sensor assembly mounted under the rim hole of the urinal.

As shown in FIG. 7, the leak detector 6 may be suspended from the rim 5 of the toilet bowl 3 along the stem 21. The leak detector 6 may be slid along the stem 21 towards the rim 5 or down into the toilet bowl 3 to properly position the wetness sensor 27. In some embodiments, the stem 21 may have a ratchet or other protrusions along its surface to allow for movement along the stem 21 in only one direction, so that once the leak detector 6 is properly placed for example below the rim hole 18 within the stream of water flow, the position will be fixed and the wetness sensor 27 will not slide or become misaligned. As shown in FIG. 9, by using two attachment hangers 29 affixed to the rim 5, the wetness sensor 27 of the leak detector 6 is directly positioned under the rim hole 18 to capture any flow of water when flushing or to detect a leak. As shown in FIG. 10, the leak detector 6 may be suspended below a rim hole 18 of a urinal 32 to be positioned directly below the water stream that flows down the face 39 of the urinal 32. As shown in FIG. 11, a sensor assembly 13 may be attached along a wire or through a wireless connection to the leak detector 6. The leak detector 6 may be mounted of affixed in a position near to the urinal 32 or toilet 1 to display on the LED 25 or using other visual or aural indicators sensor status or a leak incident requiring attention.

Figure 12:
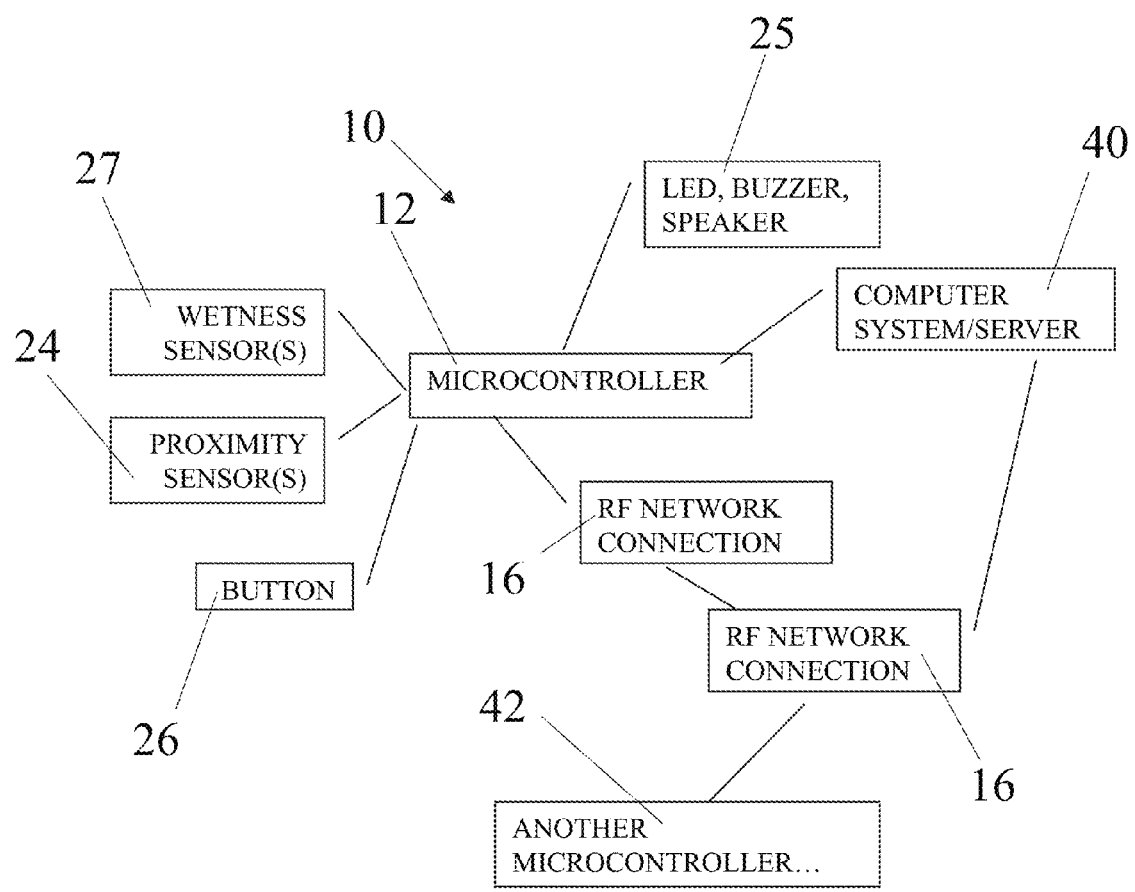
FIG. 12. is a block diagram of an embodiment of components of the invention.

A block diagram showing various components that may be integrated within the leak and overflow and prevention system 10 is shown in FIG. 12. These components may be within a single device or through a number of devices interconnected through wired and/or wireless connections. The leak and overflow and prevention system 10 may also include a central server 40 that collects data, performs data analysis and correlation of data, and transmits commands and notifications to devices and users within the leak and overflow and prevention system 10 network. Separate devices 42 may have microcontrollers 12, sensors and other components to perform data collection, data analysis and notification and alerts and transmit data to the central server 40 and/or to other devices within the system network.

The leak and overflow and prevention system 10 may use a number of different sensors having different structural components and functions. As shown in FIG. 13, in order to reduce or prevent the corrosion, a metallic conductor 35 of a sensor may be encased in graphite gel 34. In some embodiments as shown in FIG. 14, the conductors 35 coated in graphite may be flush with the casing 22 to seal the conductors 35 and prevent corrosion.

Figure 15:
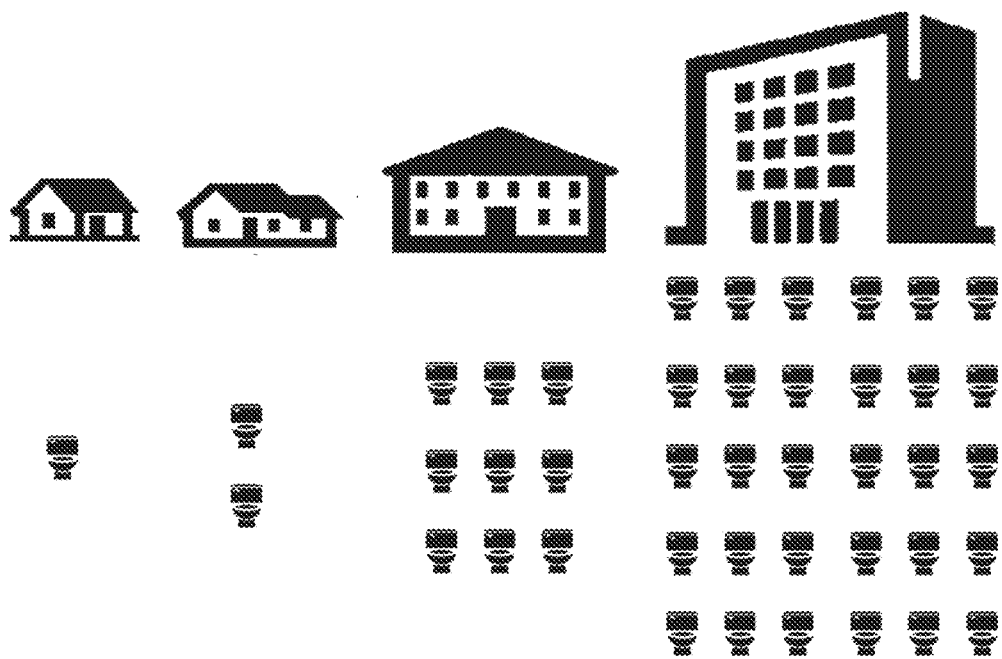
FIG. 15. is an illustration of the number of toilets found in buildings of different sizes.

As shown in FIG. 15, the leak and overflow and prevention system 10 may be used with a home residence having only one or two toilets or in a large office building have many toilets 1 with the central server 40 and leak and overflow and prevention system software capable of storage, data analysis, and system monitoring for any number of toilet systems 1.

Figure 16:
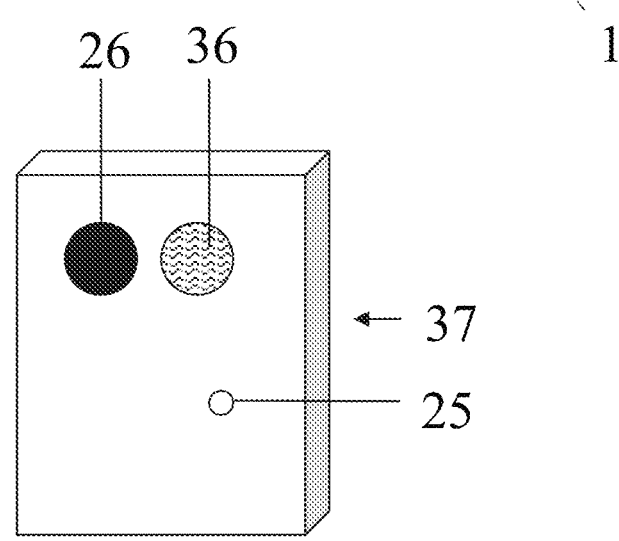
FIG. 16. is a diagram of an embodiment of a floor mounted wetness detector.
Figure 17:
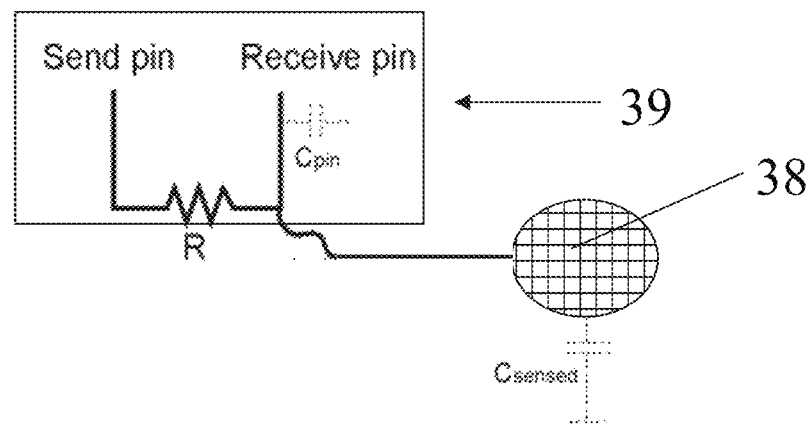
FIG. 17. is a schematic of an embodiment of a non-contact capacitive sensor circuit.
Figure 18:
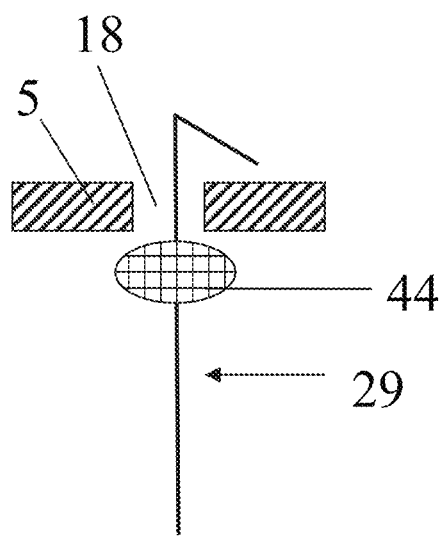
FIG. 18. is a diagram of an embodiment of a non-contact capacitive sensor configured to fit in the rim hole of a toilet or urinal.
Figure 19:
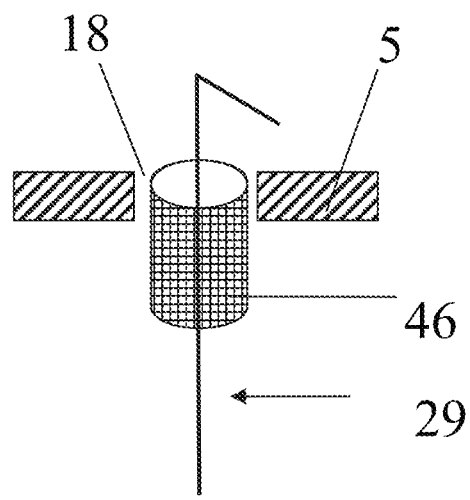
FIG. 19. is a diagram of an embodiment of a non-contact capacitive sensor configured to fit under the rim hole of a toilet or urinal.

As shown in FIG. 16, a floor mounted wetness sensor 37 incorporates an LED 25 and a buzzer 36 to alert a human, and a foot operated snooze button 26 that can be used to stop the alert or pause the alert for a predetermined but mutable amount of time. As shown in FIG. 17, in further embodiments a non-contact capacitive circuit 39, well-known to those skilled in the arts, is connected to a sensor 38. Specific embodiments of these are shown in FIG. 18 and FIG. 19, in which the sensors 44 and 46 are placed directly under or inserted into the rim holes 18, respectively. Both sensors 44 and 46 are coated with a chemically inert substance to prevent corrosion of the metallic sensor. A compromise is made between the surface area of the sensor and the impediment to water flow; a wire mesh has been suitable for this purpose. In other embodiments, sensor can be transducers such as microphones as detailed in other referenced patents integrated into the toilet. The sensors may also be pressure sensors for reading water pressure in the siphon jet which is used to provide a "boost" to evacuate the toilet. Sometimes, with vigorous plunging of a clogged toilet, the jet source can get clogged thus negatively affecting performance. Similarly, a pressure sensor integral to the toilet located in the pathway between the bottom of the toilet bowl and the flange that separates the toilet from the waste pipe can provide performance data about the evacuation of the toilet. This sensor type needs further development as these parts of the toilet may be exposed to augurs (also called "snakes") which are used to clear blockages. Abrasion by a twisting augur can easily damage a pressure sensor unless it is carefully designed.

Figure 20:
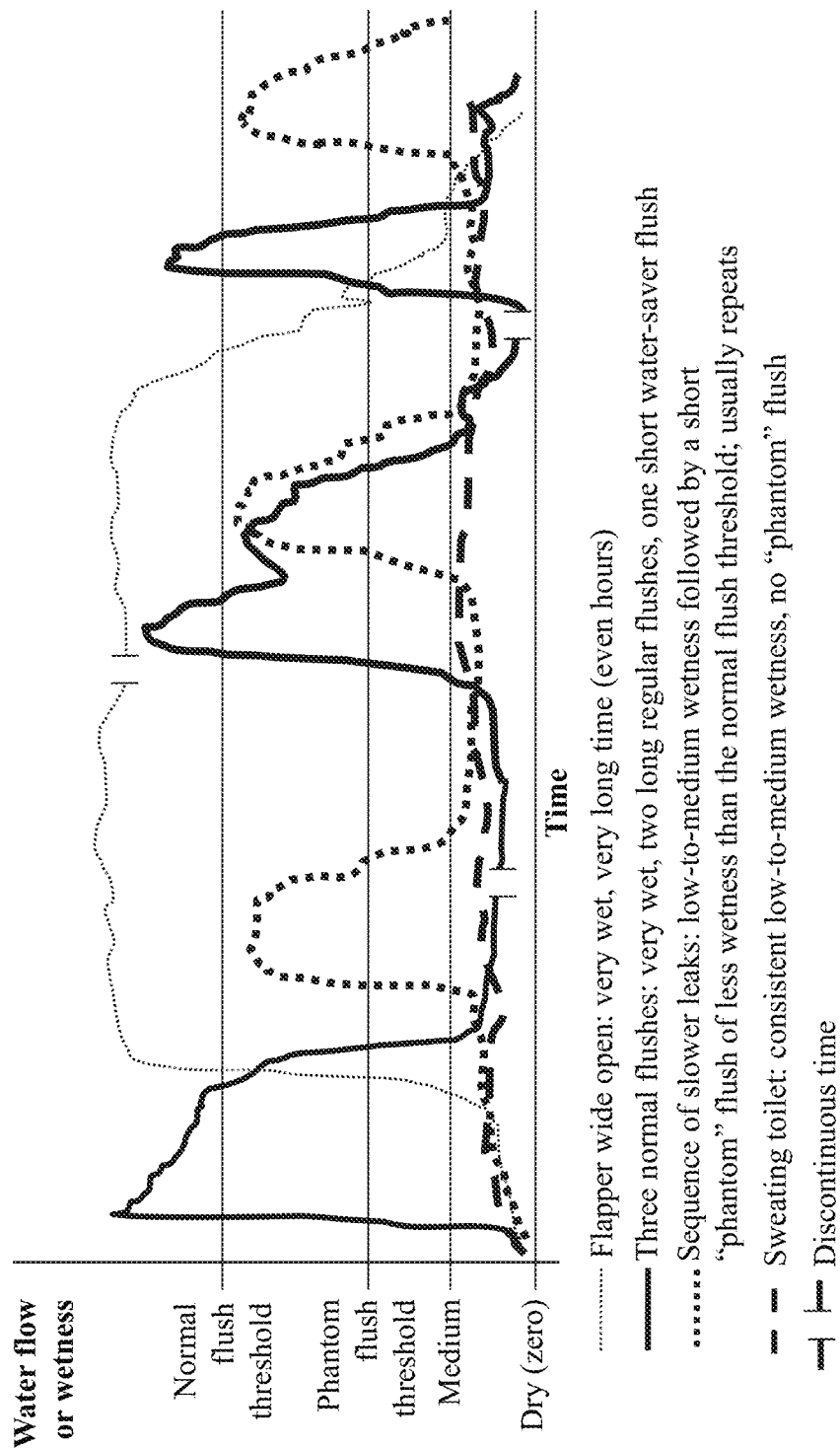
FIG. 20. is a graph showing wetness readings.

As shown in FIG. 20, shows wetness readings over time for types of water flows in a toilet, smoothed to remove artifacts due to erroneous analog-to-digital conversion of signals from the sensor and irregular flow of water over the sensor due to improper installation. The microcontroller in the device parses the sensor readings to determine which of the events above is occurring when the toilet is not in quiescent state. The graph is shown normalized on the y-axis to adjust for variations in placement of a sensor and on the x-axis for water-fill times which can depend on water pressure and the degree to which the shut-off valve to the toilet is open. The normalization can be done at either the device level or at the server or both.

Figure 21:
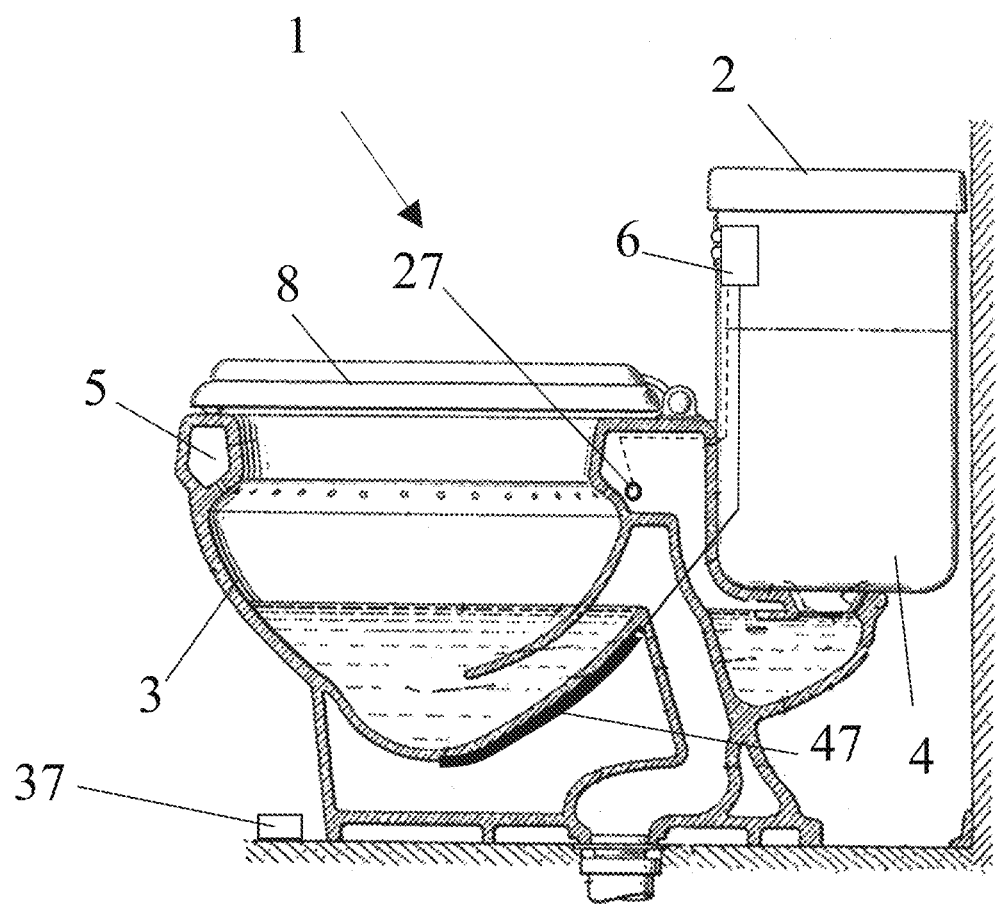
FIG. 21. is a diagram of an embodiment of a leak detector and sensor assembly integral with the toilet.
Figure 22:
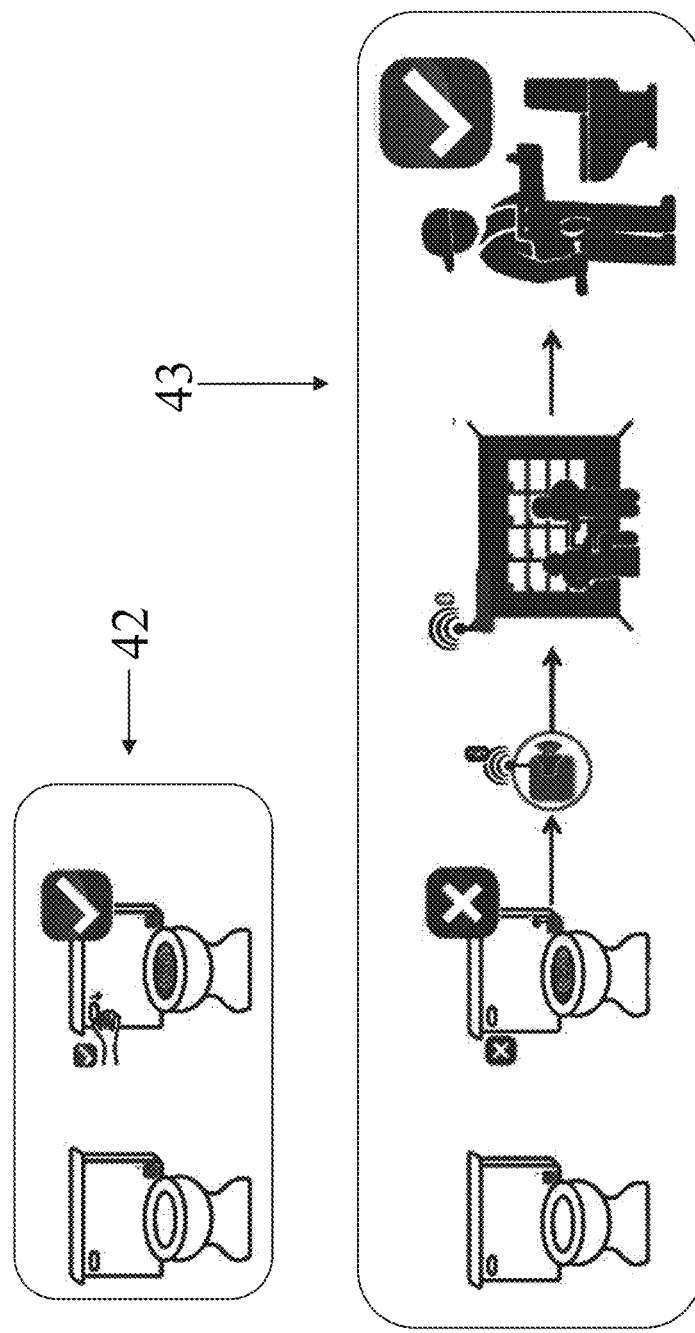
FIG. 22. is an illustration of a monitoring, maintenance and repair network for a number of toilets using the leak and overflow and prevention system of the present invention.

As shown in FIG. 21, the leak detector device 6 can also be made integral to the toilet, embedded, for example into the tank 30, with the wetness sensor 27 built in, out of view. The floor wetness subassembly 37 is connected to the leak detector device via RF. In another embodiment the sensor 47 may be a large capacitive sheet which detects the amount of water in the toilet bowl 3. The sensor sheet 47 lines the underside of the toilet bowl 3 which is generally unused space. A slow rate of change of sensor readings from the sensor 47 may indicative of a clog somewhere in the toilet system 1, meaning that attention is required providing a preventive measure prior to a clog and overflow incident.

In FIG. 27, general functioning of the leak and overflow detection and prevention system is shown. In events 42, the toilet 1 is flushed by a person, the wetness sensor 27 in the toilet is triggered, and the proximity sensor 24 is triggered indicating the presence of a human and thereby lowering the probability of the existence of a leak. In events 43, if the wetness sensor 27 is triggered, but the proximity sensor is not then there is no indication that a human is present and there is incremental probability that a leak exists. In the event that the incremental probability crosses a leak confirmation threshold based on time, sensor data from other devices in the system or correlated data and other factors, a notification is sent via a computer network to a person or a monitoring service who will then send over a repair person to address the issue.

Following are various rules that the microcontroller and/or the computer server may use to determine the status of the toilet.

Calculate "weight" during a moving time window, $W = W1 \times$(phantom flushes are detected several times)$+W2 \times$(the wetness sensor is wet longer than a predetermined amount of time, such as 5 minutes several times)$-W3 \times$(toilet is sweating; decrement probability of leak)$-W4 \times$(proximity sensor is triggered, i.e. human is near, so decrement likelihood of leak)

IF W>the leak threshold THEN take action
Calculate "weight" during a moving time window, $W = W5 \times$the water flow sensor is continually wet$+W6 \times$but there are no "phantom flushes"$+W7 \times$there is a moisture sensor external to the tank and it is wet$+W8 \times$there are other toilets in this location and they are also sweaty$+W9 \times$this toilet has already been marked as prone to sweating$+W10 \times$the water flow sensor isn't wet and the moisture sensor external to the tank is wet continuously for a long time$+W11 \times$continual wetness of the water flow sensor is co-incident with humid days per the weather report.

IF W>the toilet sweating threshold THEN take action
Calculate "weight" during a moving time window, $W = W12 \times$the water flow detector is wet for a long period of time but there are indications of$+W13 \times$proper flushes (graph in FIG xx can be used to determine the current condition) in between$+W14 \times$the high usage is around the same time of day, everyday$+W15 \times$the high usage also affects toilets in the same vicinity$+W16 \times$the high usage is from Monday through Friday and with virtually no usage on Saturday and Sunday.$+W17 \times$the high usage is co-incident with peak periods of use in a travel facility such as an airport or train station.

IF W>the high usage threshold THEN take action
Calculate "weight" during a moving time window, $W = W17 \times$water level in the toilet descends slower than normal for that toilet$+W18 \times$descends slower than in other toilets$+W19 \times$does not descend to the normal level at all$+W20 \times$rises beyond the bottom lip of the rim IF W>the overflow likely threshold THEN take action
IF W>overflow emergency THEN take emergency action!!

IF, post a normal flush, it takes longer than normal time for the water flow sensor to get dry THEN the toilet shut-off valve is not completely open. Notify system and/or human.

IF the normalized water flow readings graph is similar to other toilets but has lower amplitudes, THEN the sensor is not having enough water impinge on it. Rectify.

IF the water flow readings reach maximal value often, THEN water is not draining off the sensor properly. Rectify.

IF a low-battery message is sent to the server THEN the device's battery is low.

IF a device has not uploaded data in 2 days THEN the battery is low or the device has a problem. Send someone to inspect.

While the technology herein has been described in connection with exemplary illustrative non-limiting implementations, the invention is not to be limited by the disclosure.

The invention is intended to be defined by the claims and to cover all corresponding and equivalent arrangements whether or not specifically disclosed herein.

The invention claimed is:

1. A leak and overflow detection system for a toilet, comprising:
   a microcontroller;
   wetness sensor; and
   proximity sensor; and
   wherein false positives in leak detection are reduced by correlating proximity data with wetness sensor data to determine the presence of a human using the toilet.

2. The leak and overflow detection system for a toilet of claim 1 wherein a notification and alert is sent to a central server when a leak is detected.

3. The leak and overflow detection system for a toilet of claim 1 comprising modes of operation based on usage schedules.

4. The leak and overflow detection system for a toilet of claim 1 comprising integration of data from external wetness and proximity sensors.

5. The leak and overflow detection system for a toilet of claim 1 wherein the wetness sensor is installed directly under the rim hole to detect water at its point of exit.

6. The leak and overflow detection system for a toilet of claim 1 wherein the wetness sensor is a non-contact capacitive sensor.

7. The leak and overflow detection system for a toilet of claim 1 wherein the wetness sensor is a pressure sensor.

8. The leak and overflow detection system for a toilet of claim 1 wherein the wetness sensor is a capacitive sheet placed underneath and on the bottom of the toilet bowl.

9. The leak and overflow detection system for a toilet of claim 1 comprising an attachment hanger having a bendable hook and flexible stem for insertion into any size rim hole of the toilet.

10. The leak and overflow detection system for a toilet of claim 1 capable of use with any type of toilet.

11. The leak and overflow detection system for a toilet of claim 1 scalable to access and transmit data to tens of thousands of devices.

12. The leak and overflow detection system for a toilet of claim 1 wherein software updates to the microcontroller are upgraded remotely through a connection with a central server.

13. The leak and overflow detection system for a toilet of claim 1 wherein the proximity sensor configured to detect a water level in a toilet bowl.

14. A method of leak detection in a toilet comprising;
   detecting the proximity of a human to the toilet;
   detecting wetness on a sensor;
   correlating the detection of a human to the toilet to the detection of wetness to reduce false positives in leak detection.

15. The method of leak detection in a toilet of claim 14 comprising;
   monitoring sensor data;
   identifying conditions from sensor data;
   notifying through signal transmission, conditions indicative of impending overflow.

16. The method of leak detection in a toilet of claim 14 comprising detecting a water level in a toilet bowl of the toilet.

17. A leak and overflow detection system for a toilet, comprising:
   a microcontroller;
   wetness sensor; and
   proximity sensor; and
   wherein false positives in leak detection are reduced by correlating proximity data with wetness sensor data to determine the presence of a human using the toilet;
   wherein false positives in leak detection are reduced by correlating proximity data and wetness sensor data from other toilet systems within the leak and overflow detection system.

18. The leak and overflow detection system for a toilet of claim 17 comprising modes of operation based on usage schedules.

19. The leak and overflow detection system for a toilet of claim 17 wherein the wetness sensor is installed directly under the rim hole to detect water at its point of exit.

20. The leak and overflow detection system for a toilet of claim 17 wherein the wetness sensor is a non-contact capacitive sensor.

21. The leak and overflow detection system for a toilet of claim 17 wherein the wetness sensor is a pressure sensor.

22. The leak and overflow detection system for a toilet of claim 17 wherein the wetness sensor is a capacitive sheet placed underneath and on the bottom of the toilet bowl.

23. The leak and overflow detection system for a toilet of claim 17 comprising an attachment hanger having a bendable hook and flexible stem for insertion into any size rim hole of the toilet.

24. A leak and overflow detection system for a toilet, comprising:
   a microcontroller;
   wetness sensor; and
   proximity sensor; and
   wherein false positives in leak detection are reduced by correlating proximity data with wetness sensor data to determine the presence of a human using the toilet;
   wherein false positives in leak detection are reduced by correlating environmental conditions with sensor data.

* * * * *